(12) United States Patent
Zhao et al.

(10) Patent No.: US 10,042,055 B2
(45) Date of Patent: Aug. 7, 2018

(54) TRAFFIC VOLUME ESTIMATION

(71) Applicant: HERE Global B.V., Veldhoven (NL)

(72) Inventors: Yunjie Zhao, Chicago, IL (US); Gavril Giurgiu, Chicago, IL (US); Anton Anastassov, Naperville, IL (US)

(73) Assignee: HERE Global B.V., Eindhoven (NL)

( * ) Notice: Subject to any disclaimer, the term of this patent is extended or adjusted under 35 U.S.C. 154(b) by 0 days.

(21) Appl. No.: 15/133,917

(22) Filed: Apr. 20, 2016

(65) Prior Publication Data

US 2017/0309171 A1    Oct. 26, 2017

(51) Int. Cl.
*G08G 1/01*   (2006.01)
*G01S 19/13*  (2010.01)
*G08G 1/0968* (2006.01)

(52) U.S. Cl.
CPC ............ *G01S 19/13* (2013.01); *G08G 1/0112* (2013.01); *G08G 1/0129* (2013.01); *G08G 1/0133* (2013.01); *G08G 1/0141* (2013.01); *G08G 1/096816* (2013.01); *G08G 1/096827* (2013.01); *G08G 1/096838* (2013.01); *G08G 1/096844* (2013.01)

(58) Field of Classification Search
CPC ........ G08G 1/0125; G01S 19/13; G01C 21/34
See application file for complete search history.

(56) References Cited

U.S. PATENT DOCUMENTS

| 9,070,296 | B1 | 6/2015 | Kadous et al. | |
| 2002/0077742 | A1 | 6/2002 | Mintz | |
| 2002/0082767 | A1* | 6/2002 | Mintz | G08G 1/01 701/117 |
| 2008/0071465 | A1 | 3/2008 | Chapman et al. | |
| 2008/0077314 | A1* | 3/2008 | Ishikawa | G08G 1/096716 701/117 |
| 2014/0114885 | A1 | 4/2014 | Han et al. | |
| 2014/0207362 | A1 | 7/2014 | Shimotani et al. | |
| 2014/0222321 | A1 | 8/2014 | Petty et al. | |
| 2015/0206428 | A1 | 7/2015 | Kurzhanskiy | |

FOREIGN PATENT DOCUMENTS

WO    WO2015134434    9/2015

OTHER PUBLICATIONS

Herring et al., Estimating Arterial Traffic Conditions Using Sparse Probe Data, Sep. 19-22, 2010, 13th International IEEE Conference on Intelligent Transportation Systems.
Hofleitner et al., Learning the Dynamics of Arterial Traffic from Probe Data using a Dynamic Bayesian Network, 2012, IEEE Transactions on Intelligent Transportation Systems.

* cited by examiner

*Primary Examiner* — Yuen H Wong
(74) *Attorney, Agent, or Firm* — Lempia Summerfield Katz LLC

(57) ABSTRACT

Systems and methods for using a plurality of probe reports to augment a geographic database with traffic volume data. The plurality of probe reports are identified for a road segment for a time period. A probe value is determined for the road segment for the time period based on the plurality of probe reports. A probe probability value is calculated for the road segment for the time period based on the probe value. The probe probability value is adjusted using road attributes. The adjusted probe probability value is used to estimate traffic volume. The geographic database is augmented with the estimated traffic volume.

17 Claims, 11 Drawing Sheets

TRAFFIC VOLUME ESTIMATION

FIELD

The following disclosure relates to navigation devices or services.

BACKGROUND

Traffic volume estimates may be used for multiple purposes. Governments use traffic volume estimates as a proxy for crash rates, evaluation of infrastructure management needs, air quality, compliance and validation of travel demand model predictions. Navigation systems use traffic volume for calculating routes and generating travel times. City planners, event organizers, and developers use traffic volume to both predict and plan. Traffic volume, however, is difficult to measure and estimate. Current systems use actual observations or roadside sensors to collect traffic volume information. These methods are both expensive, limited in scope, and may need to be constantly updated as traffic patterns change.

Traffic volume data may be collected at permanent and temporary roadside sensors. At permanent sites, loop detectors, weigh-in-motion sensors, and/or other equipment is installed for year-round, long-term vehicle detection. Permanent sites may be limited in that the sensors are expensive, sometimes require construction, and may only cover a fraction of the total roadway. Temporary sites may use portable sensors for periods of a day or less once every one to five years. Temporary sites may provide a snapshot of data, but not substantial information to predict or model volume over a longer period of time. The collected information collected may be accurate, but limited to a single location and only for the time period the sensor is active.

The result of the attempts to capture traffic volume data may be spotty, inconsistent, and unreliable data. Scaling a roadside sensor network to the size required to capture accurate and reliable data would require numerous sensors operating each and every hour of each and every day.

SUMMARY

In an embodiment, a method uses a plurality of probe reports to augment a geographic database with probe probability data. The plurality of probe reports for a road segment for a time period is identified. A probe value is determined for the road segment for the time period based on the plurality of probe reports. A probe probability value is calculated for the road segment for the time period based on the probe value. The geographic database is augmented with the probe probability value.

In an embodiment, a method uses positional data from one or more vehicles to estimate traffic volume. A plurality of probe reports is identified for a road segment, the plurality of probe reports including positional data. A probe probability value is calculated for the road segment for a time period based on the plurality of probe reports for the road segment. A traffic volume model is generated based on the probe probability value and one or more roadway attributes related to the road segment. The traffic volume model is adjusted based on ground truth data.

In an embodiment, an apparatus stores estimated traffic volume data. The apparatus comprises a processor and data storage that is operatively coupled to the processor. The apparatus further comprises road segment data entities and probe probability data entities stored in the data storage. The road segment data entities represent locations of a road network located in a geographic region. Each probe probability data entity represents the probability to have a vehicle at a respective location at a respective time.

BRIEF DESCRIPTION OF THE DRAWINGS

Exemplary embodiments of the present invention are described herein with reference to the following drawings.

DETAILED DESCRIPTION

The following embodiments relate to systems and methods for estimating traffic volumes. Probe vehicles traveling through the network collect data for specific times and locations. The probe data over a period of time is used to generate a probe distribution that estimates the probability for a vehicle to be at a link at a specific time. The probe distribution and probability is adjusted using road attributes and other factors. The resulting model may be used to estimate traffic volume for road segments at various times.

Probe devices, such as those embedded in vehicles or included in navigation devices have been introduced as crowd-sourced collection devices. Probe devices provide decent coverage with low cost and low maintenance. Probe devices have performed particularly well for traffic speed estimates as the probe devices collect data at multiple locations over multiple time periods. The data collected, e.g. speed reading for a vehicle, is highly useful for predicting actual speed of the entirely of the roadway as one vehicle's speed may be indicative of the speed of other vehicles. For traffic volume estimates, probe devices do not work as well as for measuring traffic speeds. If every vehicle was outfitted with a probe device, traffic volume could be measured directly. However, the percentage of probe to total vehicles hovers around 1% and may vary drastically by location. While each probe is an indication that a single vehicle is on the roadway, a probe offers no measurement of other vehicles.

A single measurement for a vehicle may indicate that a vehicle is on a segment and traveling a certain speed (e.g. 50 km per hour). The speed measurement alone does not allow for a determination of traffic volume. A high speed for example may indicate high volume on a highway or arterial roadway where traffic is proceeding optimally. A high speed may also indicate an empty roadway with no obstructions. A low speed may indicate a congested roadway or a roadway with multiple stops or obstructions.

Figure 1:
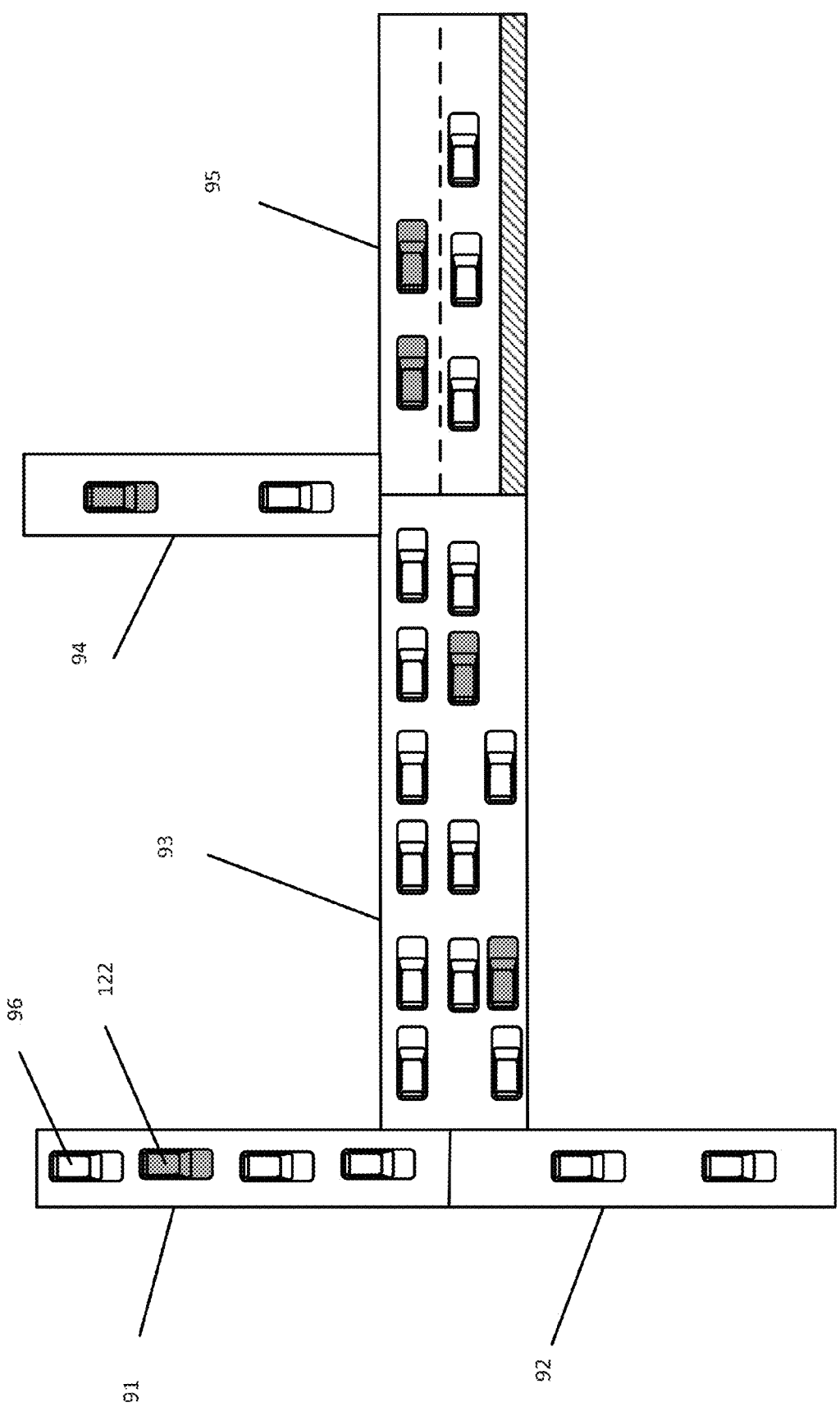
FIG. 1 illustrates an example roadway network.

FIG. 1 illustrates a roadway network including multiple road segments and multiple probe vehicles. FIG. 1 is a snapshot of the roadway network at a specific time T0. FIG. 1 illustrates five segments 91, 92, 93, 94, and 95. At the time T0, there are six probe vehicles in the roadway network represented by the shaded vehicles (e.g. 122). Non probe vehicles are represented by the non-shaded vehicles (e.g. 96). Each of the probe vehicles may include positional circuitry such as a Global Positioning System (GPS) receiver. At time T0 (and subsequent periods), the probe vehicles identify the location of the vehicle. The location, time, and other information (such as speed) is collected and used to generate a probe report for each vehicle. The probe reports may be stored locally or transmitted to a server (one by one or batched).

For T0, there may be six probe reports generated (one from each vehicle). As shown by FIG. 1, identifying the number of probes on the roadway is not an accurate representation of the traffic volume. For segment 91, there are four vehicles with one of the vehicles being a probe vehicle. However, for segment 93, there are thirteen vehicles with two of the vehicles being probe vehicles. An observer may extrapolate that with twice the probe vehicles, the volume on segment 93 would be greater than that of segment 91. An estimate of the magnitude of the difference, however, would be incorrect (4:1 vs 13:2). There is not an absolute relationship between the number of probe vehicles and traffic volume as the probe vehicles are not equally distributed within the vehicle population. However, with multiple measurements taken over time and additional roadway information, a traffic volume model and an estimation of traffic volume may be derived.

In certain embodiments, probe data collected over a period of time is used to identify the temporal and spatial distribution of probe data. The temporal and spatial distribution is used to generate a probe distribution model that represents the probability to have a probe vehicle in a given segment in a given time period. Machine learning techniques are then used with additional data from the probe, a geographic database, and outside sources to estimate traffic volume.

Figure 2:
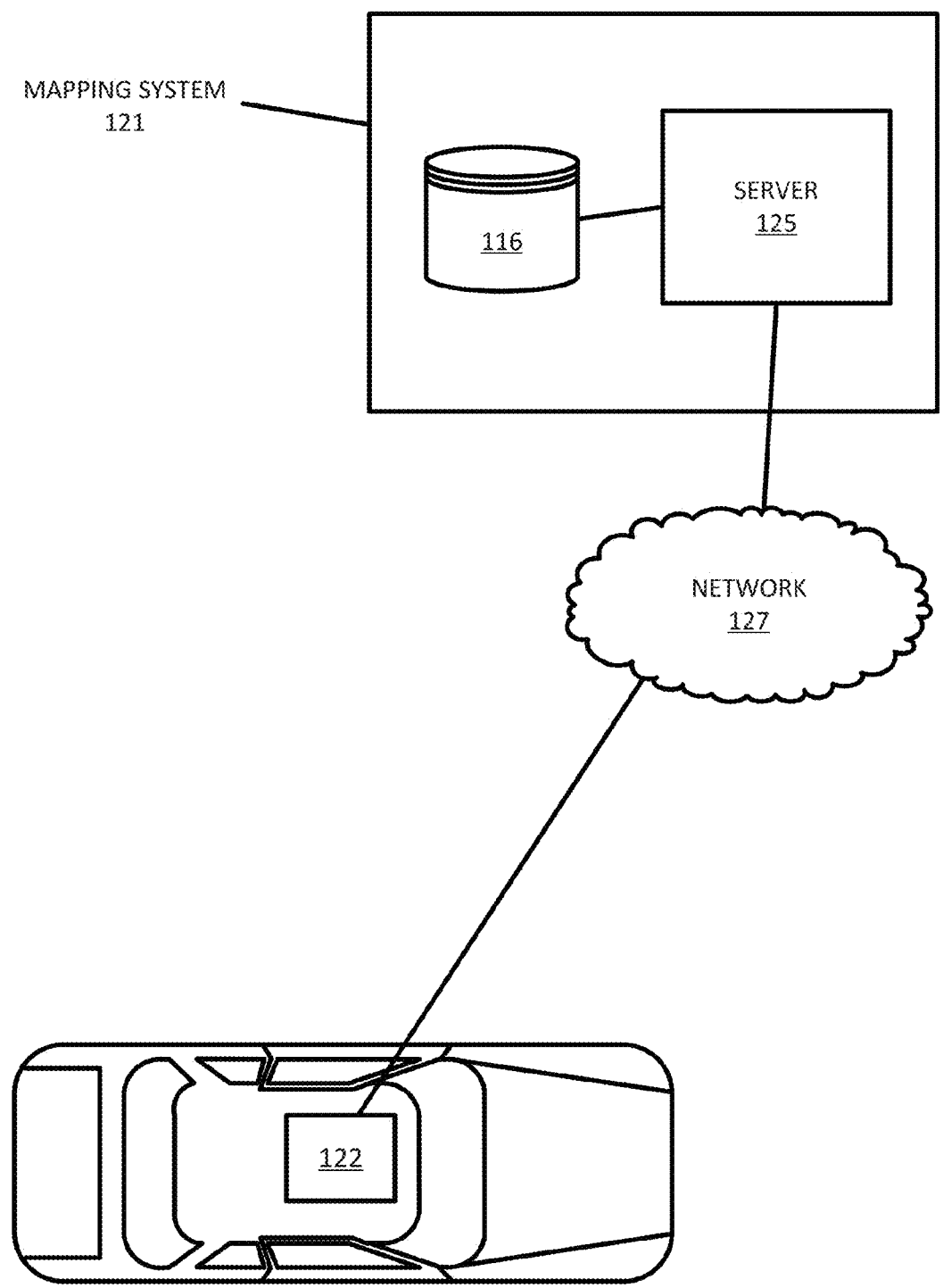
FIG. 2 illustrates an example system for estimating traffic volume.

FIG. 2 illustrates an example system for collecting and estimating traffic volume. The system includes one or more devices 122, a network 127, and a mapping system 121. The mapping system 121 may include a database 116 (also referred to as a geographic database 116 or map database 116) and a server 125. Additional, different, or fewer components may be included.

The mapping system 121 may include multiple servers, workstations, databases, and other machines connected together and maintained by a map developer. The mapping system 121 may be configured to estimate traffic volume on one or more road segments. The mapping system may also be configured to generate routes or paths between two points (nodes) on a stored map. The mapping system 121 may be configured to provide up to date information and maps to external geographic databases or mapping applications. The mapping system 121 may be configured to encode or decode map or geographic data. The traffic volume estimations may be stored by the mapping system 121 in the geographic database 116 as link, sub-link, segment, or node attributes.

Figure 3:
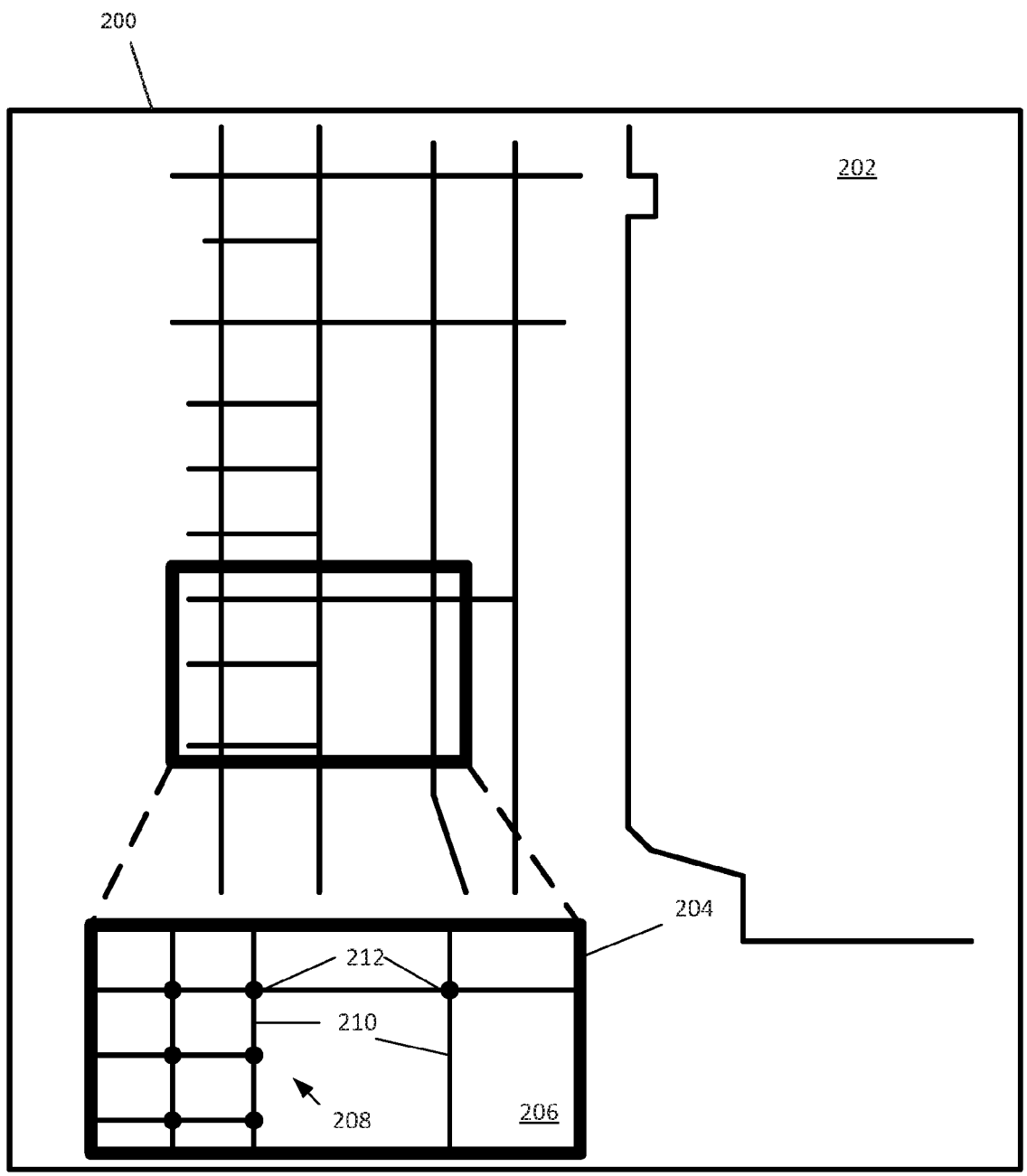
FIG. 3 illustrates a map of a geographic region.

In order to provide navigation-related features and functions to the end user, the mapping system 121 uses the geographic database 116. The geographic database 116 includes information about one or more geographic regions. FIG. 3 illustrates a map 200 of a geographic region 202. The geographic region 202 may correspond to a metropolitan or rural area, a state, a country, or combinations thereof, or any other area. Located in the geographic region 202 are physical geographic features, such as roads, points of interest (including businesses, municipal facilities, etc.), lakes, rivers, railroads, municipalities, etc.

FIG. 3 further depicts an enlarged map 204 of a portion 206 of the geographic region 202. The enlarged map 204 illustrates part of a road network 208 in the geographic region 202. The road network 208 includes, among other things, roads and intersections located in the geographic region 202. As shown in the portion 206, each road in the geographic region 202 is composed of one or more road segments 210. A road segment 210 represents a portion of the road. Each road segment 210 is shown associated with two nodes 212; one node represents the point at one end of the road segment and the other node represents the point at the other end of the road segment. The node 212 at either end of a road segment 210 may correspond to a location at which the road meets another road, i.e., an intersection, or where the road dead-ends. Each road segment 210 may include multiple sub-segments (or sub-links). A sub-segment may be a designated portion of the road segment 210. For example, a road segment 210 may be split into multiple sub-segments each 10 meters long. Traffic volume estimates may be stored using sub-segments as larger road segments may be too varied to accurately convey the traffic volume information. For example, a road segment of several hundred meters may include several different volume estimations for different sub-segments.

Figure 4:
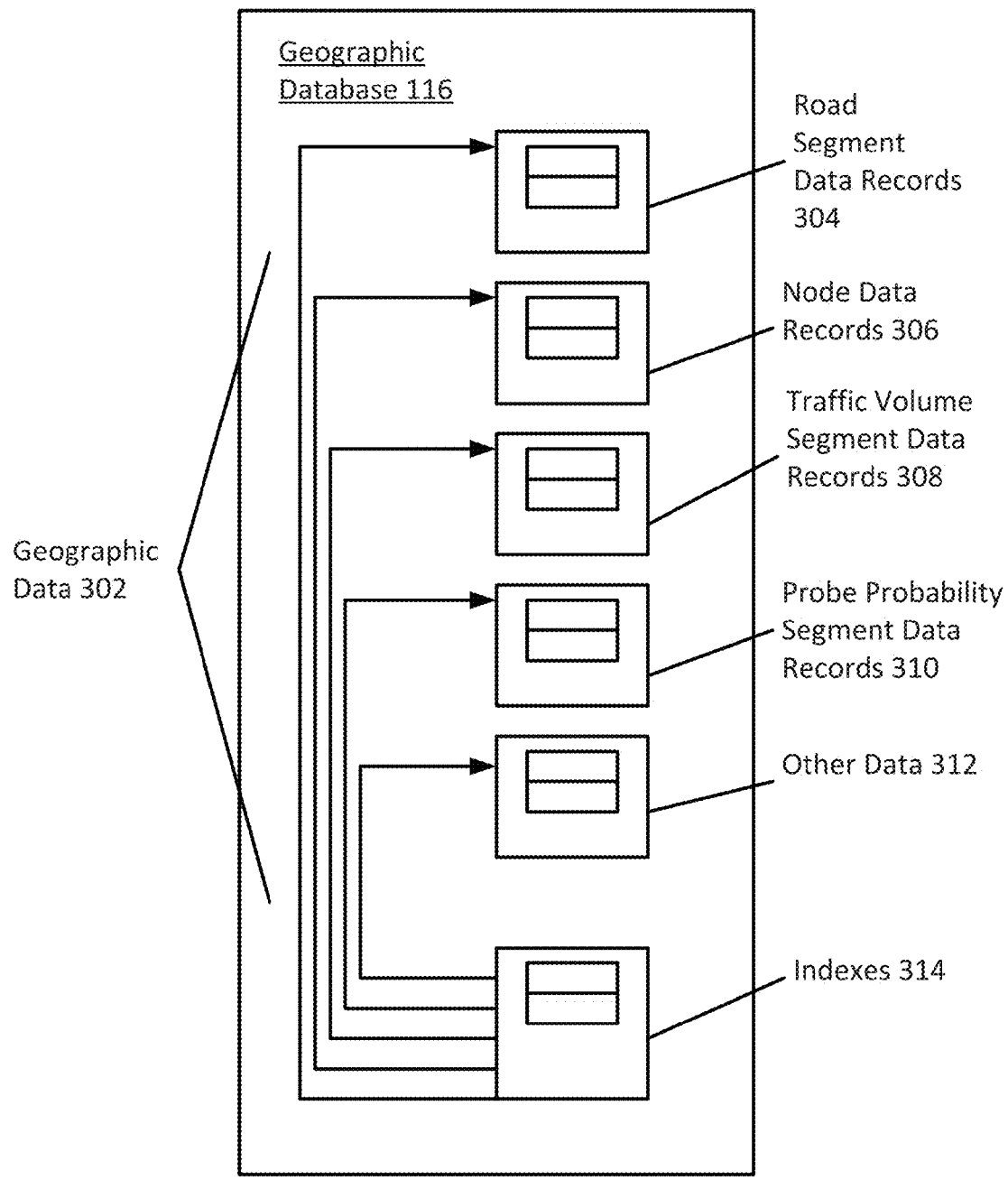
FIG. 4 illustrates a block diagram of a geographic database of FIG. 2.

Referring to FIG. 4, in one embodiment, the geographic database 116 contains data 302 that represents some of the physical geographic features in the geographic region 202 depicted in FIG. 3. The data 302 contained in the geographic database 116 may include data that represent the road network 208. In the embodiment of FIG. 4, the geographic database 116 that represents the geographic region 202 may contain at least one road segment database record 304 (also referred to as "entity" or "entry") for each road segment 210 in the geographic region 202. The geographic database 116 that represents the geographic region 202 may also include a node database record 306 (or "entity" or "entry") for each node 212 in the geographic region 202. The terms "nodes" and "segments" represent only one terminology for describing physical geographic features, and other terminology for describing features is intended to be encompassed within the scope of these concepts.

The geographic database 116 may also include other kinds of data 312. The other kinds of data 312 may represent other kinds of geographic features or anything else. The other kinds of data may include point of interest data. For example, the point of interest data may include point of interest records including a type (e.g., the type of point of interest, such as restaurant, hotel, city hall, police station, historical marker, ATM, golf course, etc.), location of the point of interest, a phone number, hours of operation, etc. The geographic database 116 also includes indexes 314. The indexes 314 may include various types of indexes that relate the different types of data to each other or that relate to other aspects of the data contained in the geographic database 116. For example, the indexes 314 may relate the nodes in the node data records 306 with the end points of a road segment in the road segment data records 304. As another example, the indexes 314 may relate point of interest data in the other data records 312 with a road segment in the segment data records 304.

Figure 5:
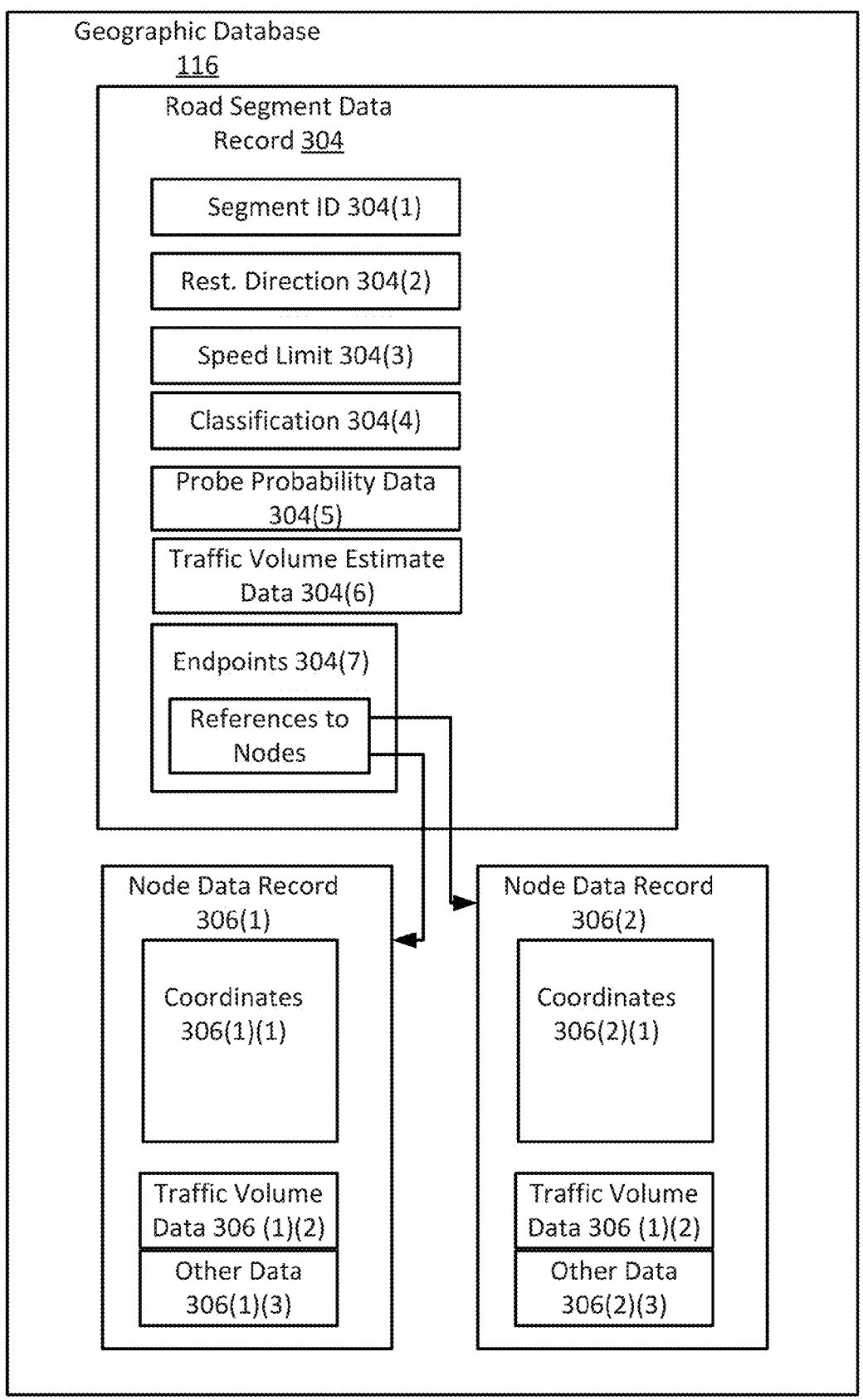
FIG. 5 illustrates a block diagram of components of data records contained in the geographic database of FIG. 4.

FIG. 5 depicts some of the components of a road segment data record 304 contained in the geographic database 116 according to one embodiment. The road segment data record 304 may include a segment ID 304(1) by which the data record may be identified in the geographic database 116. Each road segment data record 304 may be associated with information (such as "attributes", "fields", etc.) that describes features of the represented road segment. The road segment data record 304 may include data 304(2) that indicate the restrictions, if any, on the direction of vehicular travel permitted on the represented road segment. The road segment data record 304 may include data 304(3) that indicate a speed limit or speed category (i.e., the maximum permitted vehicular speed of travel) on the represented road segment. The road segment data record 304 may also include data 304(4) indicating whether the represented road segment is part of a controlled access road (such as an expressway), a ramp to a controlled access road, a bridge, a tunnel, a toll road, a ferry, and so on.

Data for traffic volume may be stored as separate records 308, 310 or in road segment data records 304. The geographic database 116 may include road segment data records 304 (or data entities) that describe features such as traffic volume 304(5) or tractor trailer volume estimations 304(6). The estimated volume may be stored as a field or record using a scale of values such as from 1 to 100 (1 being low volume, 100 being high volume) or based on a measurement scale such as vehicles per meter (or square meter), or range thereof. The estimated traffic volume may be stored using categories such as low, medium, high. Additional schema may be used to describe the estimated traffic volume. The geographic database 116 may store other data 312 relating to volume such as raw un-adjusted data. The attribute data may be stored in relation to a link/segment 304, a node 306, a strand of links, an area, or a region. The geographic database 116 may store information or settings for display preferences. The geographic database 116 may be coupled to a display. The display may be configured to display the roadway network and data entities using different colors or schemes. The geographic database 116 may store information relating to where hazardous conditions may exist, for example, though analysis of the data records and current/historical traffic conditions. Road segments with high traffic volume may be used to identify or supplement other data entities such as potential hazards. High volume along with geographic data records such as high speeds may indicate through a combination of conditions that location on a roadway is not safe.

The road segment data record 304 also includes data 304(7) providing the geographic coordinates (e.g., the latitude and longitude) of the end points of the represented road segment. In one embodiment, the data 304(7) are references to the node data records 306 that represent the nodes corresponding to the end points or sub-segments of the represented road segment.

The road segment data record 304 may also include or be associated with other data 304(7) that refer to various other attributes of the represented road segment. The various attributes associated with a road segment may be included in a single road segment record, or may be included in more than one type of record that cross-references to each other. For example, the road segment data record 304 may include data identifying what turn restrictions exist at each of the nodes that correspond to intersections at the ends of the road portion represented by the road segment, the name or names by which the represented road segment is known, the street address ranges along the represented road segment, and so on.

FIG. 5 also depicts some of the components of a node data record 306 that may be contained in the geographic database 116. Each of the node data records 306 may have associated information (such as "attributes", "fields", etc.) that allows identification of the road segment(s) that connect to it and/or the node's geographic position (e.g., its latitude and longitude coordinates). For the embodiment shown in FIG. 4, the node data records 306(1) and 306(2) include the latitude and longitude coordinates 306(1)(1) and 306(2)(1) for their node. The node data records 306(1) and 306(2) may also include other data 306(1)(3) and 306(2)(3) that refer to various other attributes of the nodes.

The geographic database 116 may be maintained by a content provider (e.g., a map developer). By way of example, the map developer may collect geographic data to generate and enhance the geographic database 116. The map developer may obtain data from sources, such as businesses, municipalities or respective geographic authorities. In addition, the map developer may employ field personnel to travel throughout the geographic region to observe features and/or record information about the roadway. Remote sensing, such as aerial or satellite photography, may be used. The database 116 is connected to the server 125.

The geographic database 116 and the data stored within the geographic database 116 may be licensed or delivered on-demand. Other navigational services or traffic server providers may access the traffic data and the estimated traffic volume data stored in the geographic database 116. Data including the estimated traffic volume data for a link may be broadcast as a service.

The server 125 may be a host for a website or web service such as a mapping service and/or a navigation service. The mapping service may provide maps generated from the geographic data of the database 116, and the navigation service may generate routing or other directions from the geographic data of the database 116. The mapping service may also provide information generated from attribute data included in the database 116. The server 125 may also provide historical, future, recent or current traffic conditions for the links, segments, paths, or routes using historical, recent, or real time collected data. The server 125 may be configured to analyze collected volume data and/or probe reports to determine an estimated traffic volume for segments or links. The server 125 may be configured to analyze data from segments and links to determine correlations between similar types of segments and nodes. For example, segments with similar volumes use may have similar accident profiles or traffic patterns.

As illustrated in FIG. 2, the server 125 is connected to the network 127. The server 125 may receive or transmit data through the network 127. The server 125 may also transmit paths, routes, or estimated traffic volume data through the network 127. The network 127 may include wired networks, wireless networks, or combinations thereof. The wireless network may be a cellular telephone network, LTE (Long-Term Evolution), 4G LTE, a wireless local area network, such as an 802.11, 802.16, 802.20, WiMax (Worldwide Interoperability for Microwave Access) network, or wireless short range network. Further, the network 127 may be a public network, such as the Internet, a private network, such as an intranet, or combinations thereof, and may utilize a variety of networking protocols now available or later developed including, but not limited to transmission control protocol/internet protocol (TCP/IP) based networking protocols.

The one or more devices 122 may include probe devices, probe sensors, or other devices 122 such as personal navigation devices 122 or connected vehicles. The server 125 may communicate with the devices 122 through the network 127. The server 125 may also receive data from one or more systems or services that may be used to predict traffic volume. The devices 122 may be a mobile device or a tracking device that provides samples of data for the location of a person or vehicle. The devices 122 may include mobile phones running specialized applications that collect location data as the devices 122 are carried by persons or things traveling the roadway system. The devices 122 may also be integrated in or with a vehicle. The devices 122 may be configured to collect and transmit data including positional, speed, and temporal data. The devices 122 may be configured to collect and transmit data including data from sensors on or about a vehicle. The road segment or link may be determined based on the geographical coordinates of the probe (e.g., GPS).

Figure 6:
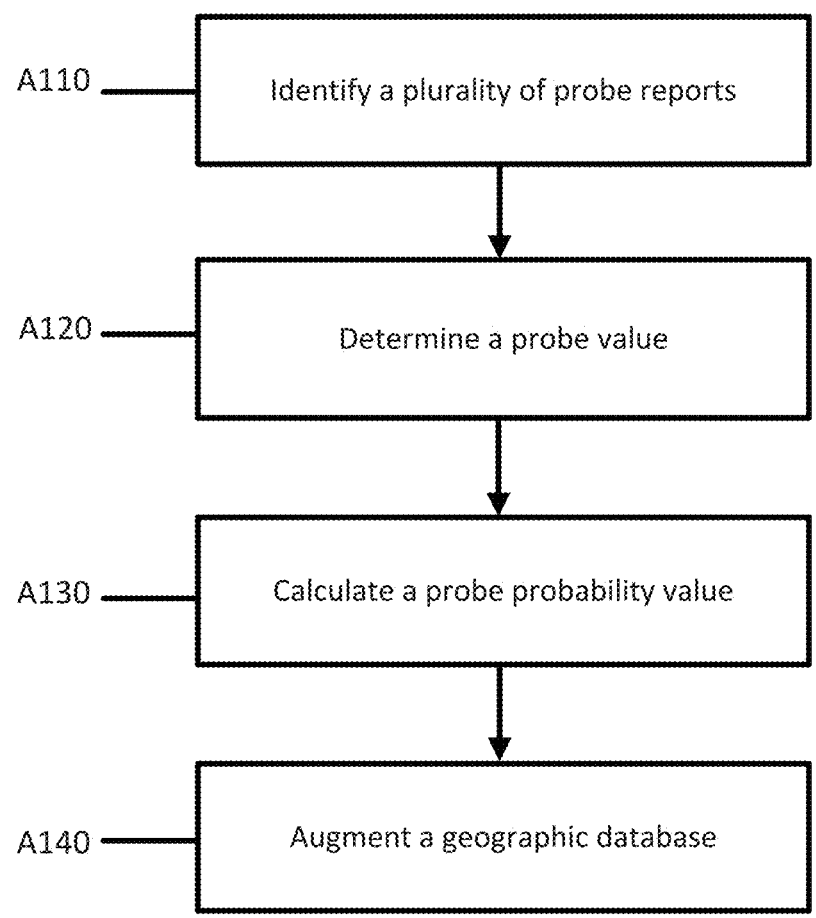
FIG. 6 illustrates an example flowchart for estimating traffic volume.

FIG. 6 illustrates an example flow chart for estimating traffic volume. As presented in the following sections, the acts may be performed using any combination of the components indicated in FIG. 2, FIG. 8, or FIG. 9. The following acts may be performed by the server 125, the device 122, the mapping system 121, or a combination thereof. Additional, different, or fewer acts may be provided. The acts are performed in the order shown or other orders. The acts may also be repeated. Certain acts may be skipped.

At act A110, the server 125 identifies a plurality of probe reports. A probe report may have been previously received and stored in the database 116. Probe reports may be generated by probe vehicles or devices. A probe report may include multiple pieces of information regarding a vehicle or device. At a minimum, a probe report may include time and positional (location) information. Using the positional information, the probe report may be assigned to a particular road segment or sub-segment. Probe reports assigned to a road segment or sub-segment may be further identified by temporal information. For example, the server may identify a set of probe reports for a specific road segment for a specified time period (e.g. from 1 pm to 2 pm).

Probe reports may be generated by probe vehicles or probe devices. As an example shown in FIG. 1, there are six probe vehicles. Each probe vehicle may produce a report for a certain time period. A probe vehicle (or device) may generate a report every second, every five seconds, every ten seconds among other time periods. For example, in FIG. 1, the probe vehicle 97 may generate a probe report that includes the time (for example, T0), the location (Segment 91), and the speed of the probe vehicle. Each probe report may be transmitted to the server 125 as the report is generated or a later time. The server 125 receives and collects the probe reports from each probe vehicle or probe device. The server 125 may then sort or assign the probe reports to a segment and a time period. Alternatively, the server 125 may use sub-segments or other positional divisions to group the probe reports. The server 125 may use narrow time windows such as a few seconds or minutes or larger windows, for example an hour. The server 125 may identify the plurality of probe reports that correspond to one or more road segment for one or more time periods.

In certain embodiments, only probe reports from specific types of vehicles may be used. For example, only probe reports from tractor trailers or trucks may be used. For road maintenance purposes only probe reports from vehicles over a certain weight may be used. Probe reports from mass transportation (e.g. a bus or train) may be excluded.

At act A120, the server 125 determines a probe value for the road segment. Under an assumption that the probability of vehicle appearance on any single road is uniformly distributed, the traffic volume may be calculated by dividing the total vehicle miles travelled by the total length of entire road network. However, a uniformly distributed traffic volume is a false assumption as some roads are more likely to be travelled than other roads for different time periods. To address this issue, the temporal and spatial distribution of probe data is determined. The probe value is calculated and used in a traffic volume model to determine the probability of that a probe (vehicle or device) is on a segment at a particular time.

Figure 7:
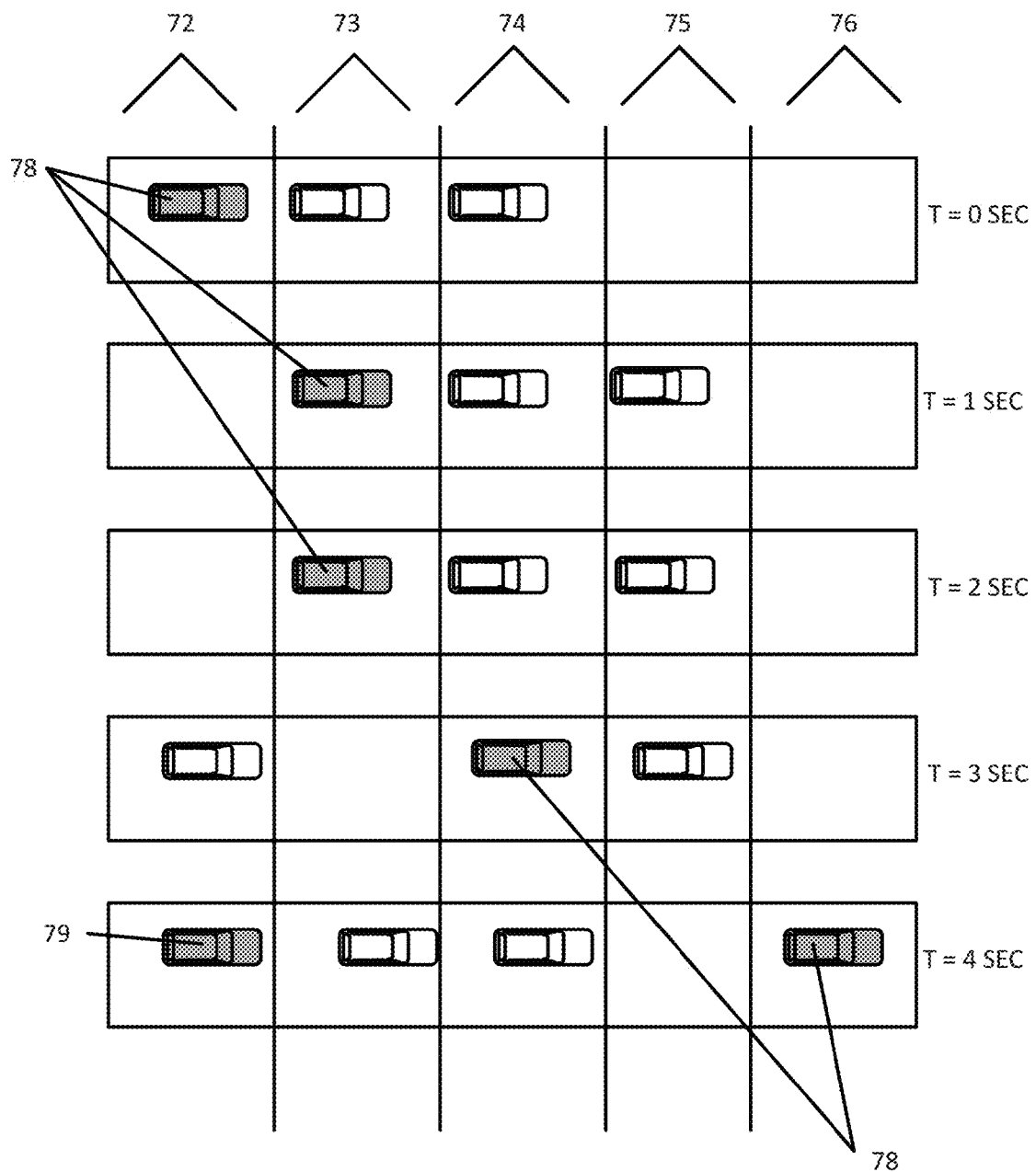
FIG. 7 illustrates example road segments over time.

FIG. 7 illustrates roadway segments over a period of time. In FIG. 7, there are five segments 72, 73, 74, 75, and 76 shown. Each segment is illustrated as approximately ten meters, however, the length of the segments may vary. There are two types of vehicles shown: probe vehicles (shaded), and non-probe vehicles (non-shaded). FIG. 7 depicts snapshots of the five segments over a period of five second. The time is indicated by the notations on the right side (T=0 SEC ... T=4 SEC). The first snapshot is taken at T=0 sec and depicts a single probe vehicle 78 in segment 72 and two non-probe vehicles in segments 73 and 74. The probe vehicle generates a first report including the time (T=0) and the location of the probe vehicle (Segment=72). Additional information may also be included such as speed (for example, 10 m/s), roadway conditions, weather, etc. The second snapshot is taken at T=1 sec and depicts the probe vehicle 78 now in segment 73 and the non-probe vehicles in segments 74 and 75. The probe vehicle 78 generates a second report including the time (T=1), the location of the probe vehicle (Segment=73), and the speed (approx. 10 m/s). The third snapshot is taken at T=2 sec and again depicts the probe vehicle 78 in segment 73 and the non-probe vehicles in segments 74 and 75. From T=1 to T=2 the probe vehicle 78 has not moved. The probe vehicle 78 generates a third report including the time (T=2), the location of the probe vehicle (Segment=73), and the speed (0 m/s). The fourth snapshot is taken at T=3 sec and depicts the probe vehicle 78 in segment 74 with non-probe vehicles in segments 72 and 75. The probe vehicle 78 generates a fourth report including the time (T=3), the location of the probe vehicle (Segment=74), and the speed (10 m/s). The fifth snapshot is taken at T=4 sec and depicts the probe vehicle 78 in segment 76 with non-probe vehicles in segments 73 and 74. The probe vehicle 78 generates a fifth report including the time (T=4), the location of the probe vehicle (Segment=76), and the speed (20 m/s). There is an additional probe vehicle 79 located in segment 72 that also will generate a report.

For a given segment, a single probe device 122 or vehicle may produce multiple probe reports (or none). The number or reports may depend on the speed of the vehicle, the length of the segment, and/or the frequency of reports. For example, a probe device 122 that generates a probe report once every 5 seconds may not generate a report for a traveled segment if the vehicle traverses a segment in less than 5 seconds. In another example, a vehicle stuck in stop and go traffic may transmit multiple reports for a single segment. In both these examples, no report and multiple reports, a simple count of the probe reports may lead to an inconsistent prediction of traffic volume. A simple count may be understood as a biased proxy of vehicle speed, as a slow-moving vehicle is generating more probes than a fast vehicle does. An extreme example is a vehicle at a red light generating lots of zero speed probe records that leaves the impression of heavy volume.

These issues are illustrated by the examples in FIG. 7. The second and third reports generated by the probe vehicle 78 both indicate there was a probe vehicle in segment 73. To count both may lead to the server 125 estimating double the volume of traffic for segment 73. Similarly, for segment 75, there are no reports. It would be an error if the server 125 estimated the volume as zero for the segment. In order to correct these errors, the probe reports may be both grouped and sorted using additional information included with the reports, such as a session identifier and/or the speed of the vehicle.

An alternative method of identifying probe reports is by using a session identifier. A session identifier assigned to a vehicle, eliminates the multiple reports from a single vehicle error. A session identifier (session ID) refers to an identifier for a set of consecutive probe reports produced by the same devise, for example, reports 1-5 generated by the probe vehicle 78 in FIG. 7. A single session ID may be used for an entire trip or a time-predefined time interval, depending on provider. Using a session id method, the useable probe reports may be roughly proportional to the actual number of vehicle, for example, the session ID may be equivalent to a vehicle passing by. However, the session IDs may be recycled, i.e. one session id used for multiple vehicles or may change every five minutes for privacy concern. Another downside of the method is that fast-moving vehicle may speed through segments (10-meter), and as such leaves less footprints than expected. For example if the segments are 10 meters long, a report is generated every second, and the speed is greater than 10 m/s (36 kilometers per hour), one or more segments may be skipped. This occurs at T=4 for FIG. 7 described above. The probe vehicle 78 is traveling approx. 20 m/s and the segments are only 10 m long. As the probe vehicle 78 only generates a report every second, there is no report generated for segment 75. As such, using a session identifier method may underestimate the traffic volume on high functional class road (e.g. freeway or major arterial) where speeds are large in relationship to the segment length or sub-segment length.

An alternative method of counting or assigning probes may be to use a count by weighted probed method. The count by weight probed method (or weighted method) counts the number of probes on segment "i", for a time period (such as an hour) of the day "j" as $n_{ij}$, each probe may be weighted as a function of the probe speed, probe cycle and length of the segment. For example, each probe may be weighted by S*T/L, where S is the probe speed (e.g. 5 meters per segment), T is probe cycle (e.g. 1 sec) and L is the length of the segment (e.g. 10 meters). The weighed method may include other variables and alternative magnitudes or multipliers e.g. 1.1*S*T/(0.78*L). The weighted method may solve some limitations of the naive count method and session ID count methods described above.

At act A130, the server calculates a probe probability value for the road segment. The probe probability value for the road segment may be the probability to have a vehicle in the segment. The probe probability value may be calculated from the probe value determined in act A120. A probability distribution may be generated from the probe value determined using the count, session id, or weighted probe method. Using the variables given above (i, j, $n_{ij}$, S, T, and L) and a plurality of probe reports, the probability to have a vehicle in a given segment in a time period is:

$$p_{ij} = \frac{n_{ij}}{\Sigma_i \Sigma_j n_{ij}} \quad \text{Equation 1}$$

$P_{ij}$ may be interpreted as the probability of a vehicle driven on segment i at hour j. Equation 1 is a model for traffic estimation that assumes homogeneity across the roadway network. The probe probability value may serve as a building block for estimating traffic. In certain embodiments, the equation may be adjusted using other data such as road attributes, events or weather conditions in order to account for real world variations.

Each of the methods: naïve count, session, or weighted, may be used when determining a probe probability. For certain types of road types, one of the methods may lead to more accurate results. Each of these methods may further be used to test or calibrate the model.

The probe distribution may take into account the type of probe device 122 or vehicle from which the probe report was generated. In certain embodiments, the probe distribution may only be calculated for a specific set of vehicles. The probe distribution may only be calculated for vehicles such as taxis or on ride sharing vehicles. The probe distribution may only be calculated for a single company's fleet of vehicles such as a delivery service. Using a targeted probe distribution model, a company may only need to equip a percentage of their vehicles with probes in order to determine where a company's fleets is dispersed.

At act A140, the server 125 generates or augments a geographic database 116. The geographic database 116 may include link and node data with associated attributes such as the estimated traffic volume data. The generated or augmented geographic database 116 may be part of a larger geographic database 116 as described above. The geographic database 116 may be used to generate or display a visual map of an area or region. Different colors or indicators may be used to indicate the levels of traffic volume for a particular segment at a particular time. The geographic database 116 may be used in a layering application, wherein a user may toggle on or off the traffic volume estimation data.

Figure 8:
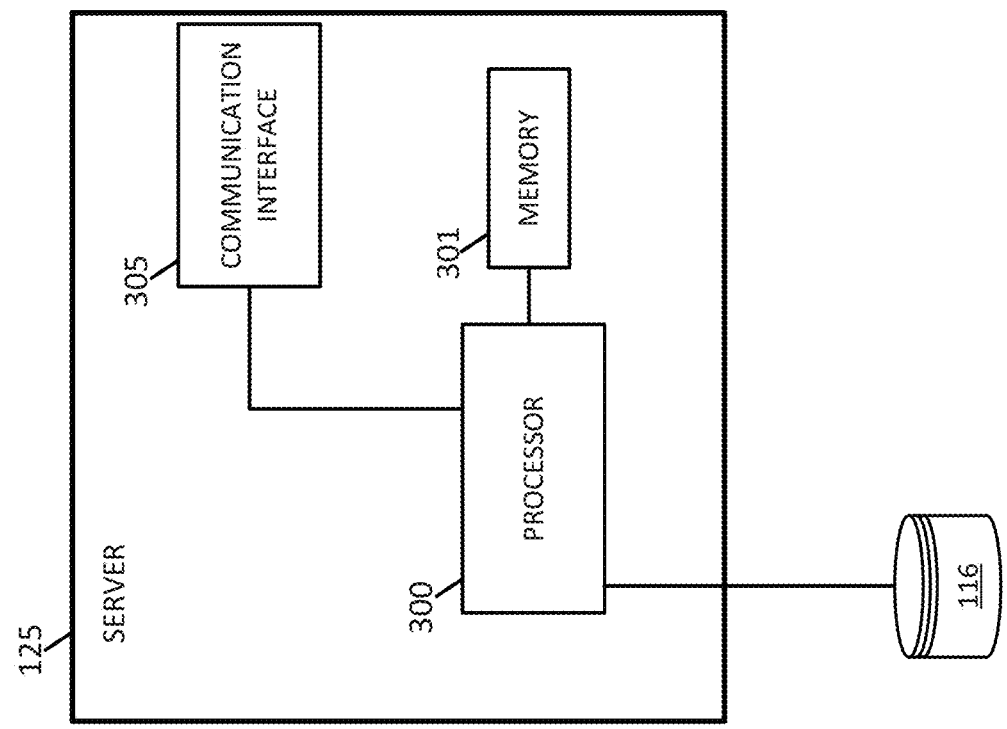
FIG. 8 illustrates an example server of the system of FIG. 2.

FIG. 8 illustrates an example server 125 of the system of FIG. 2. The server 125 includes a processor 300 that is connected to a communications interface 305 and a memory 301. The processor 300 is also connected to the database 116. The communications interface 305 is configured to receive probe reports from one or more probes or devices 122. The memory 301 is configured to store received real-time and historical data. The processor is configured to estimate traffic volume levels for a road segment. The processor may be configured to generate maps and routing instructions. Additional, different, or fewer components may be included.

Figure 9:
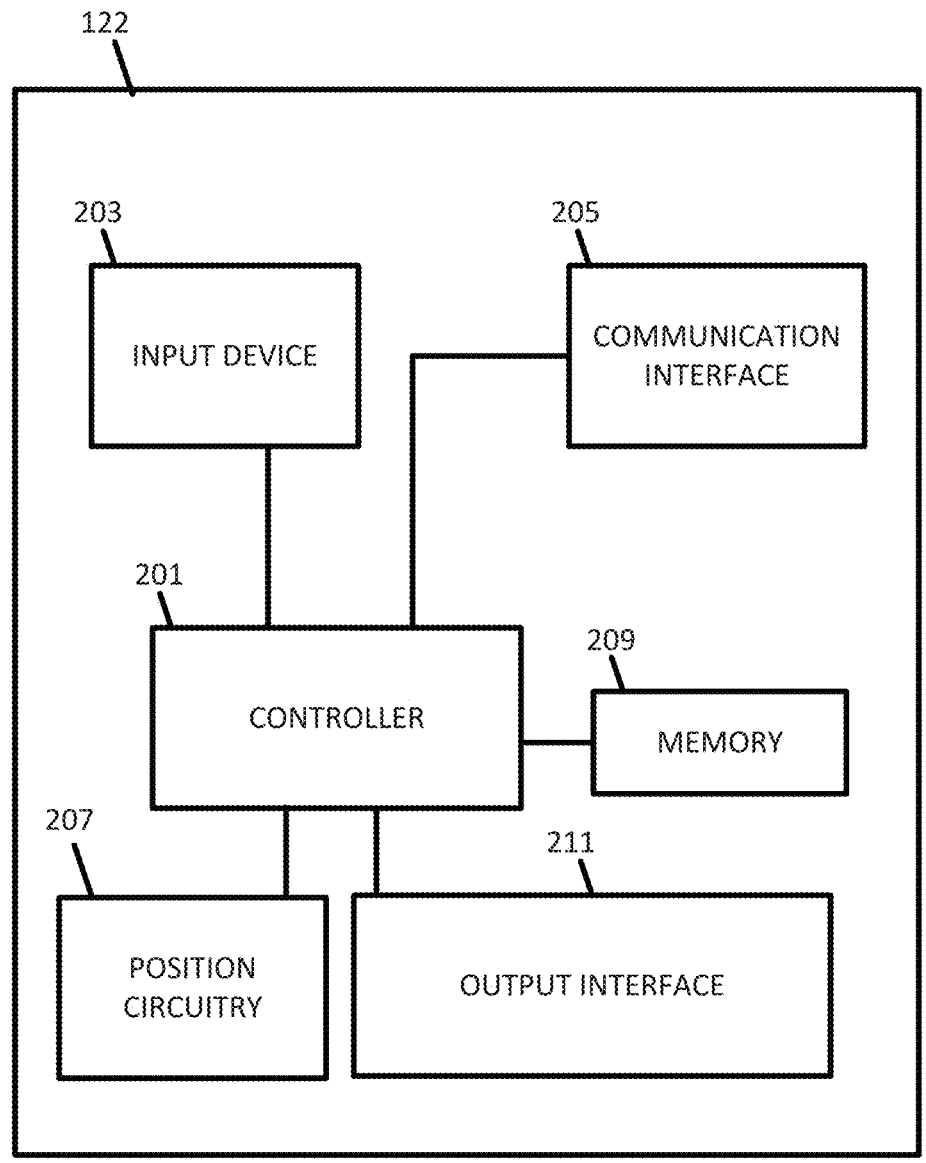
FIG. 9 illustrates an example device of the system of FIG. 2.

FIG. 9 illustrates an example device 122 of the system of FIG. 2. The device 122 may be configured to collect, transmit, receive, process, or display data. The device 122 may also be referred to as a probe 122, a mobile device 122 or a navigation device 122. The device 122 includes a controller 201, a memory 209, an input device 203, a communication interface 205, position circuitry 207, movement circuitry 208, and an output interface 211. The output interface 211 may present visual or non-visual information such as audio information. Additional, different, or fewer components are possible for the mobile device 122. The device 122 may be smart phone, a mobile phone, a personal digital assistant (PDA), a tablet computer, a notebook computer, a personal navigation device (PND), a portable navigation device, and/or any other known or later developed mobile device. In an embodiment, a vehicle may be considered a device 122, or the device 122 may be integrated into a vehicle. The device 122 may receive or collect data from one or more sensors in or on the vehicle.

A device 122 may be configured to identify a present location of the device or vehicle. The starting location and destination may be identified though the input device 203. The input device 203 may be one or more buttons, keypad, keyboard, mouse, stylus pen, trackball, rocker switch, touch pad, voice recognition circuit, or other device or component for inputting data to the mobile device 122. The input device 203 and the output interface 211 may be combined as a touch screen that may be capacitive or resistive. The output interface 211 may be a liquid crystal display (LCD) panel, light emitting diode (LED) screen, thin film transistor screen, or another type of display. The output interface 211 may also include audio capabilities, or speakers.

Figure 10:
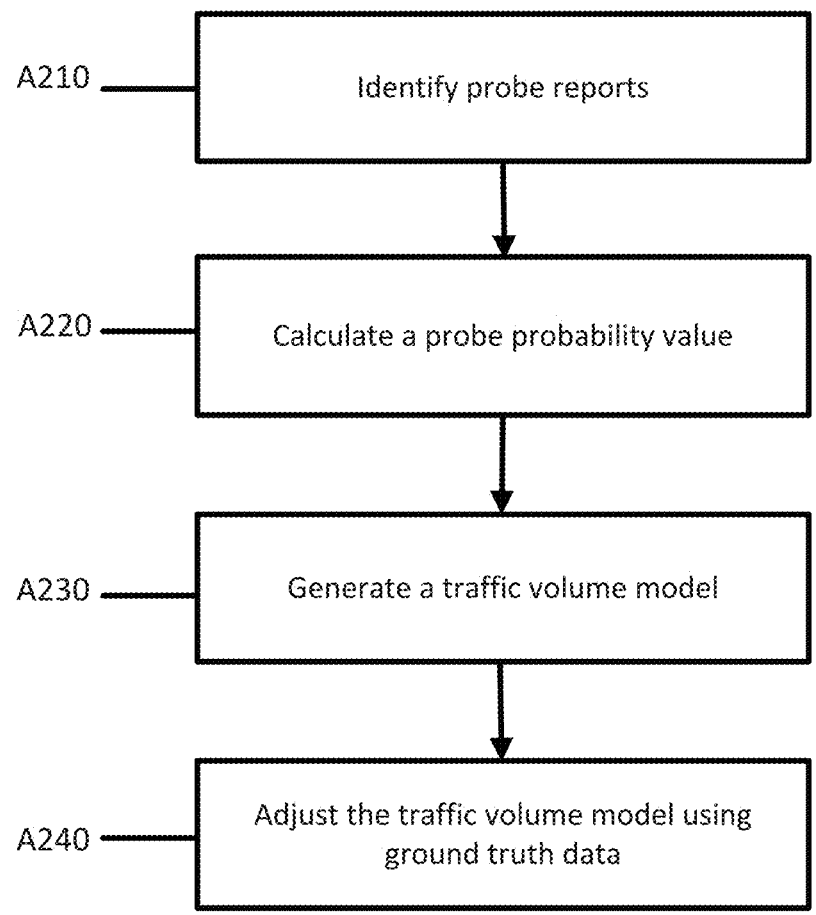
FIG. 10 illustrates an example flowchart for estimating traffic volume.

FIG. 10 illustrates an example workflow for estimating traffic volume using the server 125 of FIG. 8 or the device 122 of FIG. 9. As presented in the following sections, the acts may be performed using any combination of the components indicated in FIG. 2, FIG. 8, or FIG. 9. The following acts may be performed by the server 125, the device 122, or a combination thereof. Additional, different, or fewer acts may be provided. The acts are performed in the order shown or other orders. The acts may also be repeated. For example, acts A230 and A240 may be repeated as the server 125 uses regression techniques to calibrate a model. The acts may also be continuously repeated to provide updated for the traffic volume. For example additional probe reports may be identified in A210 after a traffic volume model in A230 has been generated. The traffic volume model may be generated again or updated using the new data.

At act A210, the server 125 identifies a plurality of probe reports. The probe reports may be stored in the database 116 or memory 301. The probe reports may include data such as positional, speed, and condition data for a vehicle or device 122.

The location of a device may be identified using positional circuitry such as GPS or other positional inputs. The positioning circuitry 207, which is an example of a positioning system, is configured to determine a geographic position of the device 122. The movement circuitry 208, which is an example a movement tracking system, is configured to determine movement of a device 122. The position circuitry 207 and the movement circuitry 208 may be separate systems, or segments of the same positioning or movement circuitry system. In an embodiment, components as described herein with respect to the navigation device 122 may be implemented as a static device. For example, such a device may not include movement circuitry 208, but may involve a speed or velocity detecting input device 203. The device 122 may identify its position as the device travels along a route using the positional circuitry. For indoor spaces without GPS signals, the navigation device 122 may rely on other geolocations methods such as LIDAR, radar, Wi-Fi, beacons, landmark identification, inertial navigation (dead reckoning), among others.

The location and time (and other data such as speed) may be combined to generate a probe report. The probe report may be then be transmitted to the server 125 using the communication interface 205. The server 125 may receive the probe report using the communications interface 305. The communication interface 205 and/or communication interface 305 may include any operable connection. An operable connection may be one in which signals, physical communications, and/or logical communications may be sent and/or received. An operable connection may include a physical interface, an electrical interface, and/or a data interface. The communication interface 205 and/or communication interface 305 provides for wireless and/or wired communications in any now known or later developed format. The communication interface 205 and/or communication interface 305 may include a receiver/transmitter for digital radio signals or other broadcast mediums. A receiver/transmitter may be externally located from the device 122 such as in or on a vehicle. A probe report may be transmitted as soon as the probe report is generated. A probe report may be stored in the device in memory 209 and transmitted in a batch for example when communications become available or on a set schedule.

The memory 209 and/or memory 301 may be a volatile memory or a non-volatile memory. The memory 209 and/or memory 301 may include one or more of a read only memory (ROM), random access memory (RAM), a flash memory, an electronic erasable program read only memory (EEPROM), or other type of memory. The memory 209 and/or memory 301 may be removable from the mobile device 122, such as a secure digital (SD) memory card. The memory may contain a locally stored geographic database or link node routing graph. The locally stored geographic database may be a copy of the geographic database 116 or may include a smaller piece. The locally stored geographic database may use the same formatting and scheme as the geographic database 116.

Referring back to FIG. 10, at act A220, the server 125 calculates a probe probability value. A probe probability value may be the probability that a vehicle is located on a segment at a given time. The probe probability value may be calculated using a probe value and generating a distribution for the probe value. The server 125 may generate the probe probability value from the plurality of probe reports. Methods for generating the probe value include a simple count method, a session identifier method, and a weighted method among others.

A simple or naïve count method may count the number of probe reports for each segment for a time period. A session identifier method may count unique session identifiers for the segment for a time period. A weighted method may use the session identifier and other attributes such as speed to determine the probe value. The probe value may be used to generate a two dimensional probability value that represents the probability that a vehicle is on a specific segment at a specific time period. The server 125 may calculate probe probability values for a plurality of road segments or sub-segments. Combined together the probe probabilities for a plurality of road segments may allow for an estimation of probe distribution for a roadway network.

Figure 11:
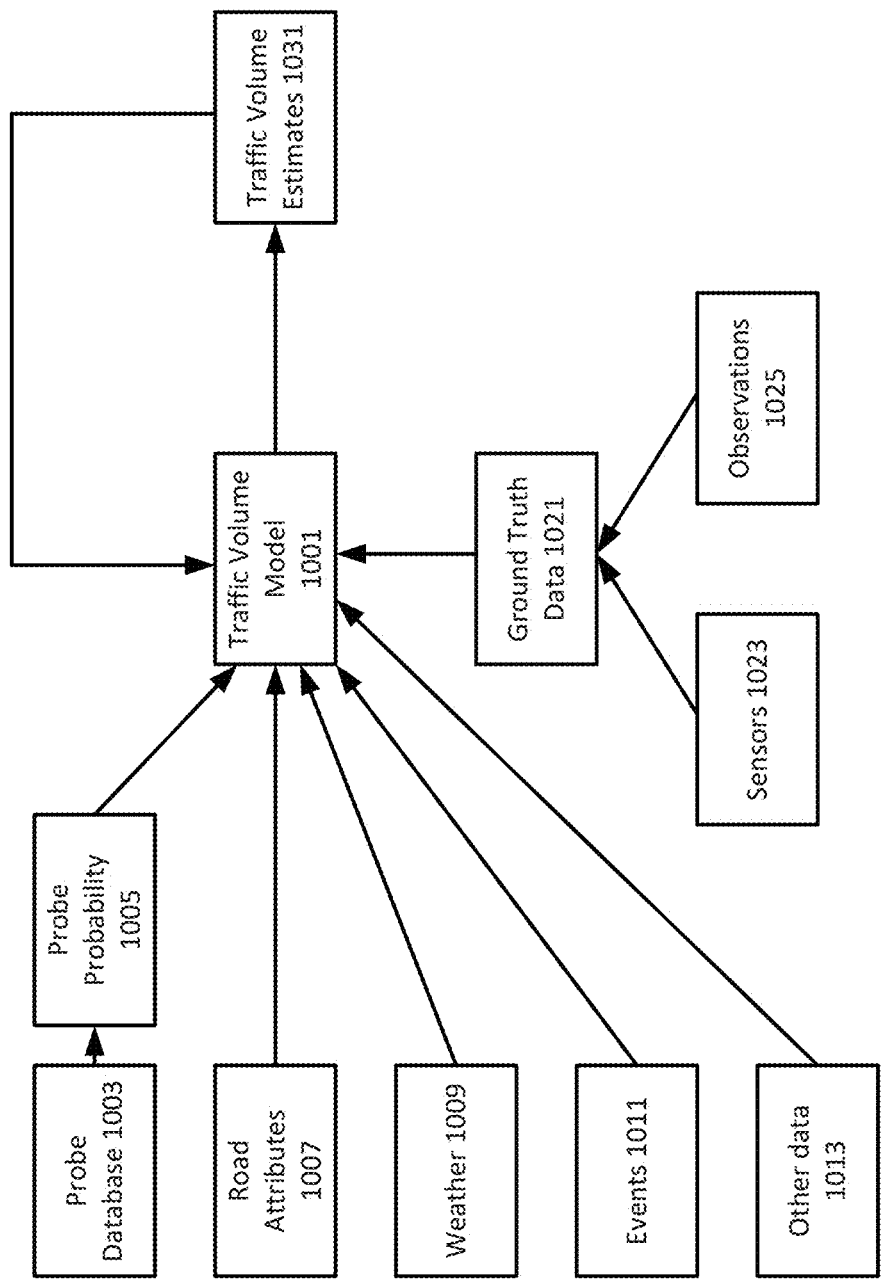
FIG. 11 illustrates an example block diagram for estimating traffic volume.

At act A230, the server 125 generates a traffic volume model. FIG. 11 illustrates a block diagram for a traffic volume model. The traffic volume model 1001 is at the center of the diagram. Inputs to the traffic volume model 1001 include probe probability 1005, road attributes 1007 (e.g. number of lanes, length, functional class and etc.), weather information 1009, special events 1011 (e.g. concerts, sporting events), other data 1013 (distance travelled per vehicle, fleet size, etc.), ground truth data 1021, and feedback from the traffic volume estimates 1031. A probe database 1003 may store a plurality of probe reports. The probe probability 1005 may be calculated at act A220.

The road attributes 1007 and roadway features may be stored in the geographic database 116. Each road segment data entry may include information related to the road segment such as the type and size of the road segment. In certain embodiments, the traffic volume estimations are determined for each road segment. The length of the road segment may be directly related to the probe distribution for estimating volume. A longer road segment may be more likely to have a probe vehicle on it at any given time as opposed to a shorter road segments. This is a generalization that may also depend on the type of roadway. A short segment of a freeway may handle much more volume than an isolated rural road segment even though the rural road segment is much longer.

The number of lanes may be used in the model. As shown in FIG. 1, segment 95 has two lanes. Segment 93 has three lanes. Both segment 93 and 95 each have two probe vehicles on the respective segments at time T0. The model may use the number of lanes of both segment 93 and 95 to estimate volume, for example, by increasing the volume estimation on segment 93 even if the probe distribution is determined to be about equal.

The model may account for changes to the road attributes or other inputted data. For example, the number of lanes may change during the time period for when the probe data is collected and the distribution is calculated. A segment that had multiple lanes closed for a period of time (e.g. a week) may have decrease probe distribution for that time period and as such may have an abnormally low probe distribution probability. The model may correct for changes by using past historical data or comparisons with similar road segments.

The functional class of the road segment may be used to estimate the volume. Different classes of roads may have different expectations of probes. In general, roads such as highways or freeways will have more vehicular volume than other types of roadways. The increase in volume may be identified by the probe distribution; higher trafficked roadways may have increased number of probe vehicles. In certain situations, certain functional road classes may exhibit more or less volume than expected. For example, certain roadways may be preferred by vehicles using navigation systems (either by default or user preference). The roadways may exhibit a higher probe vehicle distribution than expected due to certain navigation systems acting as probes. The model may use such observations to correct the volume estimations.

The model may be both adjusted and filtered based on vehicle or probe types. Probe vehicles may be identified by their type such as the size of the vehicle. In certain embodiments, the model may take into account the type of vehicles in certain areas to correct for estimation errors. For example, large trucks may not be permitted on a road segment or only for certain hours. As such, the probe distribution may not correctly predict an accurate volume if the fleet of probe vehicles is weighted towards large trucks. Large trucks may also take up more space on a road segment and therefore be counted differently for certain uses. Probes received from bikes or pedestrians may also be separated out (either in act A230 or earlier when received or identified by the server 125). In certain embodiments, the server 125 may calculate the volume of bicyclists much in the same manner as calculating vehicle volume. Probe reports from mass transportation such as buses or carpools may also be identified and take into account.

Weather information 1009 may be used to adjust up and down traffic volume estimates. Weather that is occurring during probe report generation may affect the volume of traffic on the roadways. A blizzard, for example, may force most vehicles off the streets. Although the server 125 may have received few to no reports for certain segments (for example, those side streets not plowed), the lack of reports is not an indication of the roadway segment at that time for a different day when there the weather does not affect the traffic volume. When calculating the estimated traffic volume, current weather conditions may also be used to adjust or filter the model.

Event data 1011 may also be used to adjust traffic volume estimates. Probe reports taken over a long period of time (e.g. months) may be diverse enough to smooth out any outlier events that would adversely affect the probe distribution. Such events, however, may also be excluded or included as a weight when generating the probe distribution. Events may also be taken into consideration when the server 125 calculates current traffic volume estimates. For example, a sporting event may cause increased volume over the expected normal traffic volume. The increase volume may be estimated based off of previously observed and recorded events. The estimated volume may also be calibrated based on a recent (during the event) snapshot of the probe vehicles on the roadway network. Event data may also be supplemented with additional ground truth data acquired from roadside sensors. Advanced planning and coordination for increased traffic volume allows agencies to develop and deploy optimal operational strategies, traffic control plans, protocols, procedures, and technologies needed to control traffic and share real-time information with other stakeholders on the day of an event. These capabilities allow agencies to proactively manage and control traffic to accommodate the increased travel demand generated by the event and use the available roadway capacity in the most efficient and effective manner.

The traffic volume model 1001 may use traffic volume estimations 1031 for similar segments. For example, adjacent segments may have similar estimations and variations over time.

At act A240, the server 125 adjusts the traffic volume model using ground truth data 1021. The server 125 may use machine learning techniques to adjust the traffic volume model. Machine learning may make predictions based on known data to adjust or calibrate the traffic volume model. For example, data from roadside sensors 1023 may be used with regression methods to adjust the traffic volume model generated in A230. Machine learning techniques such as support vector machines (SVMs), forest methods, or neural network methods may be used to train the traffic volume model.

The traffic volume model may be trained using ground truth volume measurements 1021. Actual volume data collected using roadside sensors 1023 may be used. Actual volume data may also be collected using other methods such as direct observation 1025. Sensor data 1023 may serve as ground truth to train the traffic volume model. The sensor data may be limited and as such may only provide a small training set for a limited time period. The calibrations and training may take place categorically to account for the limited training set. The server 125 may identify geographic (countries, zones, cities, neighborhoods) biases. There may be functional road type biases (highways, arterial, city, rural, side streets etc.). There may be lane type biases. Other categories may be based off of road segment attributes stored in the database 116. The road segments may be sorted using multiple attributes such as both zones and road types. For example, one way streets in a certain zip code or city center or suburban neighborhood.

There are several ways to correct the biases. The server 125 may apply a calibration factor based on the ground truth data. For example, for a geographic bias, the server 125 divides the geographic database 116 into tiles or zones. For each tile, the server 125 may calculate the average of errors rates of all roadside stations within the tile (the difference between the ground truth versus the estimated volume) and adjust the tile's calibration factor based on the average error. Another approach is to calculate the average error rate for each functional class road and calibrate accordingly. The server 125 may correct the bias by comparing and contrasting similar road segments based on the road attributes stored in the database 116. For example, the one way streets with three or more lanes in an urban environment may underestimate volume. Each roadway segment that satisfies the requirements may have the segment's volume adjusted.

Using machine learning, the server 125 may apply multiple adjustments to a single segment. For example, the estimated volume for a segment may be adjusted down due to the number of lanes, but adjust up due to a number of stops signs present.

The traffic volume model may be used to estimate traffic volume for a segment and a time period. The server 125 may store estimation data for each segment in the database 116 as an attribute. The estimations may be updated as additional probe reports are received or identified.

The server 125 may generate a route using the estimated traffic volume data in the geographic database 116 or display the volume data. The server 125 may publish volume data using a traffic management channel (TMC), or through intelligent transportation systems (ITS), or other broadcast system or schema. The geographic database 116 may be used with real-time data to estimate local conditions and to generate operating instructions or suggestions for a vehicle. For example, the server 125 may receive a request for the estimated traffic volume for one or more segments. The server 125 may calculate updated traffic volume for a road segment based on the time, the roadway conditions, weather conditions, and/or previously estimated traffic volume. Regression techniques may be used to further correct for biases and similar segments.

The server 125 may generate multiple routes including different options for both time, types of road segments, and volume. One route may be limited to only using road segments that have low volume. Another route may additionally use road segments that have both low volume and high speed. Each route may also be generated with current or expected traffic conditions to give an estimated time of arrival. The route may be transmitted to a device 122. The route may be displayed using a geographic database 116.

The server 125 may publish or make available the traffic volume estimates for other uses. Traffic volume data is used for determining funding for the maintenance and improvement of highways. Many agencies or governments use rough estimates derived from short term data collection and simple growth calculations. Since it is not possible to count every vehicle on every street, sample counts are taken along larger streets to get an estimate of traffic on half-mile or one-mile street segments. Average daily traffic (ADT) counts are used by city planners, transportation engineers, real-estate developers, marketers and many others for myriad planning and operational purposes. The traffic volume estimates derived from the traffic volume model described above may offer much more accurate estimates than the current ADT estimates. The traffic volume model is further configured to offer estimates for different times of the year and may be updated constantly as opposed to limited data collection using road side sensors or observers. The traffic volume model may offer greater coverage (more segments) and better temporal coverage (hour by hour instead of daily, monthly, or yearly estimates).

Traffic volume may further be used by construction or planning firms to predict and plan. Closing a street or lane may cause unwanted volume to be shifted to alternative routes leading to unintended consequences. The traffic volume model may be used to identify potential changes. Likewise when planning or altering construction such as entrances or exits for vehicles, the traffic volume model may be used to identify correct locations or configurations. Configuration or placement of traffic lights, stop signs, or other signage may be derived from the traffic volume model. Traffic light cameras or speed cameras may be implemented based on the traffic volume model.

Businesses may use the traffic volume model to identify locations or areas that have a high number of potential customers. For example, a roadway with high volume and low speed may be beneficial for a billboard while one with low volume and high speed may be less desirable.

The traffic volume may be transmitted to a device 122. A device 122 may be configured to execute routing algorithms using a geographic database 116 with received or calculated traffic volume estimations to determine an optimum route to travel along a road network from an origin location to a destination location in a geographic region. Using input from an end user, the device 122 examines potential routes between the origin location and the destination location to determine the optimum route in light of volume preferences or parameters. The device 122 may then provide the end user with information about the optimum route in the form of guidance that identifies the maneuvers required to be taken by the end user to travel from the origin to the destination location. Some devices 122 show detailed maps on displays outlining the route, the types of maneuvers to be taken at various locations along the route, locations of certain types of features, and so on. The device 122 may be configured to request a route from the starting location to the destination using traffic volume preferences. The navigation device 122 may further request preferences for the route including road volume levels.

The device 122 is configured to receive the route. The route may be generated from a geographic database 116. The route may include traffic volume estimates in the form of attributes for road segments, links, or nodes. Depending on the preferences and the request, the route may only contain segments that meet a threshold for volume. The route may include notifications for segments that are high volume. The route may include notifications for areas or segment that have low volume.

The route may be displayed using the output interface 211. The route may be displayed for example as a top down view or as an isometric projection. Road segments may be colored or shaded differently depending on the road segment's estimated volume. For example, a high volume roadway may be highlighted in yellow, while a low volume side road may be a shade of grey. While relative and/or subject terminology may be used throughout to describe levels of volume, it will be appreciated that the use of such terminology is for convenience and that one of ordinary skill in the art would appreciate that the adequacy of volume is dependent on the application or implementation of a device dependent thereon. What may be considered high volume for one application may be medium to low volume for another. However, in all such situations the disclosed embodiments may be utilized to objectively map volume levels at various areas in a manner that may then be evaluated and utilized based on the intended application. The device 122 may store both the route and data for the surrounding area in a local memory.

The route may be generated with additional information from a geographic database 116. Routes for cyclists, who may prefer low volume roads for safety reasons, may be generated specifically for those modes of transportation. Pedestrian routes may be limited to high volume roadways for safety or low volume route that have no sidewalk etc.

The device 122 may determine a route or path from a received or locally geographic database using the controller 201. The estimated road volume may be used to directly or indirectly navigate a vehicle. The device 122 may be integrated into an autonomous vehicle or a highly assisted driving (HAD) vehicle. The device 122 may be configured as a navigation system for an autonomous vehicle or a HAD. An autonomous vehicle or HAD may take route instruction based on the link and node information provided to the navigation device 122.

As described herein, an autonomous driving vehicle may refer to a self-driving or driverless mode that no passengers are required to be on board to operate the vehicle. An autonomous driving vehicle may be referred to as a robot vehicle or an autonomous driving vehicle. The autonomous driving vehicle may include passengers, but no driver is necessary. Autonomous driving vehicles may park themselves or move cargo between locations without a human operator. Autonomous driving vehicles may include multiple modes and transition between the modes.

As described herein, a highly assisted driving (HAD) vehicle may refer to a vehicle that does not completely replace the human operator. Instead, in a highly assisted driving mode, the vehicle may perform some driving functions and the human operator may perform some driving functions. Vehicles may also be driven in a manual mode that the human operator exercises a degree of control over the movement of the vehicle. The vehicles may also include a completely driverless mode. Other levels of automation are possible.

The autonomous or highly automated driving vehicle may include sensors for identifying the surrounding and location of the car. The sensors may include GPS, light detection and ranging (LIDAR), radar, and cameras for computer vision. Proximity sensors may aid in parking the vehicle. The proximity sensors may detect the curb or adjacent vehicles. The autonomous or highly automated driving vehicle may optically track and follow lane markings or guide markings on the road. Traffic volume may affect the quality and quantity of data being received from the sensors. More traffic volume may mean additional obstacles to track and avoid. More traffic data may also indicate additional potential for collisions. An autonomous vehicle may select road segments that have lower estimated traffic or adjust the operation of the autonomous vehicle due to increased or decreased volume.

The term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

As used in this application, the term 'circuitry' or 'circuit' refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

Processors suitable for the execution of a computer program include, by way of example, both general and special purpose microprocessors, and anyone or more processors of any kind of digital computer. Generally, a processor receives instructions and data from a read only memory or a random access memory or both. The essential elements of a computer are a processor for performing instructions and one or more memory devices for storing instructions and data. Generally, a computer also includes, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The memory may be a non-transitory medium such as a ROM, RAM, flash memory, etc. The processor and the memory can be supplemented by, or incorporated in, special purpose logic circuitry.

To provide for interaction with a user, embodiments of the subject matter described in this specification can be implemented on a device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

We claim:

1. A method using a plurality of probe reports to estimate a quantity of vehicles on a road segment, the method comprising:
   identifying, by a processor, the plurality of probe reports for the road segment in a roadway network acquired at increments over a time period, the roadway network comprising a plurality of road segments;
   calculating, by the processor, a weighted probe value ($n_{ij}$) for the road segment as a function of the plurality of probe reports weighted by dividing the product of a probe speed and a probe cycle by a length of the road segment for each of the probe reports of the plurality of probe reports;
   calculating, by the processor, a probe probability value ($p_{ij}$) for the road segment using another function:

$$p_{ij} = \frac{n_{ij}}{\sum_i \sum_j n_{ij}}$$

wherein i is a number of probes on the road segment, j is the time period, and $n_{ij}$ is the weighted probe value;
   generating, by the processor, an estimate of the quantity of vehicles that are on the road segment during the time period, wherein the estimate of the quantity of vehicles is generated based on the probe probability value and one or more roadway attributes related to the road segment;
   adjusting, by the processor, the estimate of the quantity of vehicles based on ground truth data; and
   controlling, by the processor, traffic volume by transmitting routing instructions to one or more navigation devices on the roadway based on adjusted estimates of the quantity of vehicles on the plurality of road segments.

2. The method of claim 1, wherein the plurality of probe reports are received from one or more probe vehicles.

3. The method of claim 1, wherein determining the weighted probe value further comprises:
   identifying, by the processor, a probe session identifier for each of the plurality of probe reports; and
   counting, by the processor, the unique session identifiers for the road segment for the time period.

4. The method of claim 1, wherein the probe probability value is a two dimensional probability distribution function representing a probability for a vehicle to be on the road segment for the time period.

5. The method of claim 1, wherein the road segment is divided into one or more sub-segments and the probe probability value is calculated for the one or more sub-segments.

6. The method of claim 1, wherein the plurality of probe reports include positioning data derived from a GPS (global positioning system) system.

7. The method of claim 1, wherein the weighted probe value is only determined for vehicles over a threshold weight.

8. The method of claim 1, further comprising:
   identifying, by the processor, one or more weather conditions related to the road segment; and
   adjusting, by the processor, the estimate of the quantity of vehicles based on the one or more weather conditions.

9. The method of claim 1, wherein adjusting the estimate of the quantity of vehicles comprises:
   adjusting, by the processor, the estimate of the quantity of vehicles using machine learning techniques.

10. The method of claim 1, wherein the ground truth data is generated from one or more roadside sensors for the road segment.

11. The method of claim 1, wherein the one or more road attributes include a number of lanes.

12. The method of claim 1, further comprising:
    calculating, by the processor, the estimate of the quantity of vehicles for the plurality of road segments;
    grouping, by the processor, the plurality of road segments into one or more regional tiles;
    wherein the estimate of the quantity of vehicles is based on the probe probability values for the plurality of road segments; and
    wherein the estimate of the quantity of vehicles is adjusted separately for each of the one more regional tiles.

13. The method of claim 1, further comprising:
    generating, by the at least one processor, an estimate of flow rate of vehicles that are on the road segment during the time period, wherein the estimate of flow rate of vehicles is generated based on the probe probability value and one or more roadway attributes related to the road segment;
    adjusting, by the at least one processor, the estimate of flow rate of vehicles based on ground truth data; and controlling, by the at least one processor, traffic volume by transmitting routing instructions to one or more navigation devices based on the adjusted estimate of flow rate of vehicles.

14. A non-transitory computer readable medium including instructions, that when executed by at least one processor, cause the at least one processor to perform a method for using a plurality of probe reports to estimate a quantity of vehicles on a road segment, the method comprising:
receive a plurality of probe reports for a road segment in a roadway network for increments over a time period, the roadway network comprising a plurality of road segments;
weighing each probe report of the plurality of probe reports using a probe speed and a probe cycle for each of the probe reports and a length of the road segment;
determine a weighted probe value for the road segment for the time period based on the weighted plurality of probe reports;
generate a probability distribution function representing a probability value for a vehicle to be on the road segment for the time period using the function:

$$p_{ij} = \frac{n_{ij}}{\sum_i \sum_j n_{ij}}$$

wherein i is a number of probes on the road segment, j is the time period, and $n_{ij}$ is the weighted probe value;
generating the estimate of the quantity of vehicles on the road segment based on the probability distribution function and one or more roadway attributes related to the road segment;
adjust the estimate of the quantity of vehicles based on ground truth data; and
control traffic volume by transmitting routing instructions to one or more navigation devices on the roadway based on adjusted estimates of the quantity of vehicles for the plurality of road segments.

15. The non-transitory computer readable medium of claim 14, wherein the road segment is divided into one or more sub-segments and the probe probability value is calculated for the one or more sub-segments.

16. An apparatus for using a plurality of probe reports to estimate a quantity of vehicles on a road segment, the apparatus comprising:
at least one processor; and
at least one memory including computer program code for one or more programs, the at least one memory configured to store the computer program code configured to, that when executed by the at least one processor, cause the apparatus to at least perform:
identifying the plurality of probe reports for a road segment in a roadway network acquired at increments over a time period, the roadway network comprising a plurality of road segments;
weighing each probe report of the plurality of probe reports using a probe speed and a probe cycle for each of the probe reports of the plurality of probe reports and a length of the road segment;
determining a weighted probe value for the road segment for the time period based on the weighted plurality of probe reports;
calculating a probe probability value for the road segment for the time period using the function:

$$p_{ij} = \frac{n_{ij}}{\sum_i \sum_j n_{ij}}$$

wherein i is a number of probes on the road segment, j is the time period, and $n_{ij}$ is the weighted probe value;
generating the estimate of the quantity of vehicles based on the probe probability value and one or more roadway attributes related to the road segment;
adjusting the estimate of the quantity of vehicles based on ground truth data; and
controlling traffic volume by transmitting routing instructions to one or more navigation devices on the roadway based on adjusted estimates of the quantity of vehicles for the plurality of road segments.

17. The apparatus of claim 16, wherein the road segment is divided into one or more sub-segments and the probe probability value is calculated for the one or more sub-segments.

* * * * *